(12) United States Patent
Bergman et al.

(10) Patent No.: US 11,011,038 B2
(45) Date of Patent: May 18, 2021

(54) METHOD AND SYSTEM FOR SECURITY TAGGING

(71) Applicant: SENSORMATIC ELECTRONICS, LLC, Boca Raton, FL (US)

(72) Inventors: Adam S. Bergman, Boca Raton, FL (US); Sergio M. Perez, Lake Worth, FL (US)

(73) Assignee: SENSORMATIC ELECTRONICS, LLC, Boca Raton, FL (US)

( * ) Notice: Subject to any disclaimer, the term of this patent is extended or adjusted under 35 U.S.C. 154(b) by 0 days.

(21) Appl. No.: 16/439,364

(22) Filed: Jun. 12, 2019

(65) Prior Publication Data

US 2020/0394884 A1 Dec. 17, 2020

(51) Int. Cl.
*G08B 13/24* (2006.01)
*G06K 7/10* (2006.01)

(52) U.S. Cl.
CPC ....... *G08B 13/2457* (2013.01); *G08B 13/242* (2013.01); *G08B 13/246* (2013.01); *G08B 13/2417* (2013.01); *G08B 13/2454* (2013.01); *G06K 7/10297* (2013.01)

(58) Field of Classification Search
None
See application file for complete search history.

(56) References Cited

U.S. PATENT DOCUMENTS

| | | | |
|---|---|---|---|
| 8,523,065 B1* | 9/2013 | Wade | G07F 13/10 141/94 |
| 9,460,597 B1* | 10/2016 | Clark | G08B 13/2454 |
| 2013/0048724 A1* | 2/2013 | Burnside | G06Q 10/087 235/385 |
| 2014/0085089 A1* | 3/2014 | Rasband | G08B 13/246 340/572.1 |
| 2014/0091932 A1* | 4/2014 | Mohiuddin | G08B 13/242 340/572.1 |
| 2014/0091933 A1* | 4/2014 | Mohiuddin | G08B 13/246 340/572.1 |
| 2016/0364968 A1* | 12/2016 | Sharpy | G08B 13/242 |
| 2016/0364969 A1* | 12/2016 | Casanova | E05B 73/0017 |
| 2017/0006027 A1* | 1/2017 | Hagiwara | H04L 63/0853 |
| 2018/0040219 A1* | 2/2018 | Clark | G08B 13/2428 |
| 2019/0188982 A1* | 6/2019 | Lavery | G08B 13/2434 |
| 2019/0251505 A1* | 8/2019 | Simms | G06Q 10/0836 |
| 2019/0332754 A1* | 10/2019 | Andersen | G06K 9/00892 |

* cited by examiner

*Primary Examiner* — Chico A Foxx
(74) *Attorney, Agent, or Firm* — Arent Fox, LLP (57) ABSTRACT

Aspects of the present disclosure include methods, apparatus, and computer readable medium for managing a removal code of a tag includes providing information associating the tag with a merchandise item, wherein the information includes a removal code for removing the tag from the merchandise item, receiving, from a requesting device, a request for the removal code, authenticating the request, and transmitting, in response to successfully authenticating the request, the removal code to the requesting device, wherein the removal code is configured to be transmitted by the requesting device to the tag to remove the tag from the merchandise item.

19 Claims, 6 Drawing Sheets

METHOD AND SYSTEM FOR SECURITY TAGGING

BACKGROUND

Merchandise offered by a vendor may be sold via the online store of the vendor, and/or one or more "brick-and-mortar" stores of the vendor. For the online store sale, a customer may digitally place an order for merchandise via the online store, and the vendor may ship the ordered merchandise to the customer. For the physical sale, the customer may enter the one or more brick-and-mortar stores of the vendor and purchase the merchandise. Unfortunately, for both online sales and physical sales, the vendor and/or the customer may encounter loss due to external theft, internal theft, and/or operational error. For example, thieves may steal the merchandise from the one or more brick-and-mortar stores of the vendor. In other cases, an employee of the vendor may also steal the merchandise. In another example, merchandise may be lost during inventory or transport due to operational errors. For the online sale, thieves may steal the merchandise after the vendor delivers and leaves the merchandise somewhere accessible to the thieves (e.g., leaving at the front door of a delivery location).

Whether selling via the online store and/or the one or more brick-and-mortar stores, many vendors utilize loss-prevention measures to minimize the number of misplaced or stolen merchandise. Some loss-prevention measures include security monitoring, inventory tracking, and article surveillance. In particular, article surveillance may include using a tag (e.g., electromagnetic, magneto-acoustic, or radio frequency (RF) tag) attached to the merchandise. However, many tags may be inconvenient to use, may be removed only by the employees of the one or more brick-and-mortar stores, and/or may not be suitable or convenient for online sales of merchandise. Further, the tags may have limited functionalities. Therefore, improvements in tags are desirable.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

An aspect of the present disclosure includes a method for managing a removal code of a tag includes providing information associating the tag with a merchandise item, wherein the information includes a removal code for removing the tag from the merchandise item, receiving, from a requesting device, a request for the removal code, authenticating the request, and transmitting, in response to successfully authenticating the request, the removal code to the requesting device, wherein the removal code is configured to be transmitted by the requesting device to the tag to remove the tag from the merchandise item.

Some aspects of the present disclosure includes a server for removing a tag from a merchandise item includes a memory and one or more processors configured to provide information associating the tag with a merchandise item, wherein the information includes a removal code for removing the tag from the merchandise item, receive, from a requesting device, a request for the removal code, authenticate the request, and transmit, in response to successfully authenticating the request, the removal code to the requesting device, wherein the removal code is configured to be transmitted by the requesting device to the tag to remove the tag from the merchandise item.

Certain aspects of the present disclosure includes a non-transitory computer readable medium having instructions stored therein that, when executed by one or more processors of a server, cause the one or more processors to provide information associating the tag with a merchandise item, wherein the information includes a removal code for removing the tag from the merchandise item, receive, from a requesting device, a request for the removal code, authenticate the request, and transmit, in response to successfully authenticating the request, the removal code to the requesting device, wherein the removal code is configured to be transmitted by the requesting device to the tag to remove the tag from the merchandise item.

An aspect of the present disclosure includes a method for removing a tag from a merchandise item includes transmitting, from the handheld device to a server, a request for a removal code for removing a tag from a merchandise item, wherein the request includes authentication information, receiving, in response to transmitting the request, the removal code from the server, and transmitting the removal code to the tag to remove the tag from the merchandise item.

Some aspects of the present disclosure relate to a requesting device for removing a tag from a merchandise item, wherein the requesting device includes a memory, at least one of a NFC driver or a RF transceiver, and one or more processors configured to transmit a request for a removal code for removing a tag from a merchandise item, wherein the request includes authentication information, to receive, in response to the request, the removal code from the server, and transmit the removal code to the tag to remove the tag from the merchandise item.

Certain aspects of the present disclosure includes a non-transitory computer readable medium having instructions stored therein that, when executed by one or more processors of a handheld device, cause the one or more processors to transmit, from the handheld device to a server, a request for a removal code for removing a tag from a merchandise item, wherein the request includes authentication information, receive, in response to transmitting the request, the removal code from the server, and transmit the removal code to the tag to remove the tag from the merchandise item.

BRIEF DESCRIPTION OF THE DRAWINGS

The features believed to be characteristic of aspects of the disclosure are set forth in the appended claims. In the description that follows, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advantages thereof, will be best understood by reference to the following detailed description of illustrative aspects of the disclosure when read in conjunction with the accompanying drawings, wherein:

DETAILED DESCRIPTION

According to some aspects of the present disclosure, loss prevention may be important for online purchases that are delivered to the homes of the customers. Delivery drivers may leave the delivered items in an insecure area near the homes of the customers, such as the front porch, in the mail box, or other publicly accessible locations. To deter theft, tags may be added to the items to prevent would-be thieves from utilizing or reselling the items. The vendor of the purchased items may transmit removal codes to the mobile devices of the customers so the customers may rely on the mobile devices to remove the tags from the items.

In one implementation, for example, the tags may stay on the items until the customers use an app and/or removal codes to remove the tags from the items. This may prevent stolen packages from being used.

In some examples, the items may be tracked during transit.

In some implementations, the tags may include RF or other energy harvesting functionalities which may be powered by the customers' cellular phone or another RF infrastructure.

In certain aspects, the tags may include self-detaching functionality. For example, once the tags receive power and the removal code, the tags may be released from the items.

In a non-limiting example, each tag may include a status display or light emitting diodes (LEDs) for transmitting a status to the customers.

Figure 1:
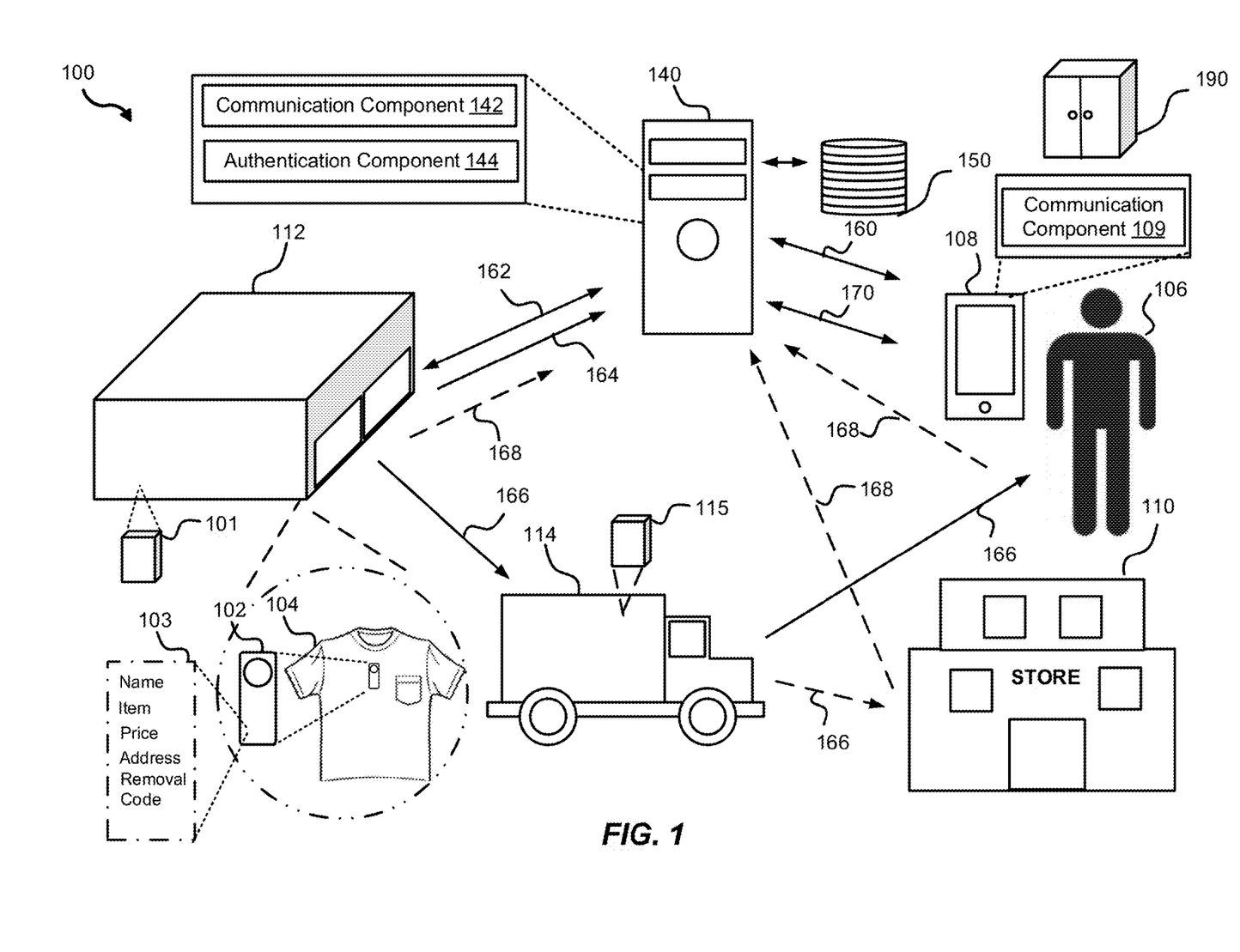
FIG. 1 illustrates an example of an environment for utilizing a tag in accordance with aspects of the present disclosure.

Turning now to FIG. 1, an environment 100 for utilizing a security tag 102 that remains on a merchandise item 104 until authorized removal by a customer 106 may include the customer 106 attempting to purchase the merchandise item 104 online or in a store 110. The tag 102 may include, but is not limited to, an electromagnetic tag, a magneto-acoustic tag, a Bluetooth tag, or a radio frequency (RF) tag, any combination thereof, or any other type of tag that may be used for electronic article surveillance. In some implementations, the customer 106 may purchase the merchandise item via a handheld device 108, which may also be referred to as a removal device or a requesting device. The handheld device 108 may include a wireless device, a mobile phone, a cellular phone, a tablet computer, a personal digital assistant, a smartphone, or other portable devices capable of wireless communications. The handheld device 108 may include communication component 109 to transmit a removal code request and receive a removal code to enable the customer 106 via the handheld device 108 to remove the tag 102 from the merchandise item 102. For instance, in an implementation, the handheld device 108 is configured to remove the tag 102 from the merchandise item 102 at a location remote from the point of sale, e.g., remote from the store 110 or the online point of sale. The handheld device 108 may be configured to communicate via RF communication, wired communication, near-field communication (NFC), and other communication mechanisms.

Still referring to FIG. 1, in some aspects, the environment 100 may include a warehouse 112 for storing the merchandise item 104 and a vehicle 114 that transports the merchandise item 104. Although illustrated as a truck, it should be understood that the vehicle 114 may be any type of vehicle, such as a car, truck, tractor trailer, train, plane, helicopter, boat, drone, autonomous vehicle, or any other machine capable of transporting the merchandise item 104. The environment 100 may also include a management server 140 communicatively coupled with an optional data repository 150 for managing the purchase, delivery, authentication, customer information storage/retrieval, and tag removal processes discussed herein. In an implementation, the management server 140 may be a computer device having a processor and a memory storing computer-executable instructions to perform the functions described herein, and the data repository 150 may be a memory device storing data and/or computer-readable instructions associated with the functions described herein. The management server 140 may include a communication component 142 for communicating with the handheld device 108, and an authentication component 144 for authenticating requests to remove the tag 102. For example, the communication component 142 may include one or more modems operable according to one or more technologies (e.g., wireline and/or wireless), and the authentication component 144 may be a security processor and/or computer-readable instructions executed by a processor and include particular instructions for executing authentication algorithms described herein. More specifically, the communication component 142 may be configured to receive the removal code request, and/or transmit customer information and/or the removal code. Also, more specifically, the optional data repository 150 may be configured to store information such as customer information, a number of removal codes, inventory information, and/or merchandise item information. In some implementations, the management server 140 may be remote from the warehouse 112 and the customer 106.

In some examples, the merchandise item 104 may be sold by a vendor. The vendor may be a commercial company that sells products and/or services. For example, the vendor may sell one or more merchandise items 104, such as in the form of a fashion merchandise, appliances, books, and/or other products. The tag 102, store 110, warehouse 112, the vehicle 114, the management server 140, and/or the optional data repository 150 may be owned by the vendor. Alternatively, some of the tag 102, store 110, warehouse 112, the vehicle 114, the management server 140, and/or the optional data repository 150 may be entities (e.g., organizations or individuals) contracted by the vendor.

In an example implementation of the present disclosure, the customer 106 may purchase the merchandise item 104 in the online store of the vendor via the handheld device 108 or any other computer device, as represented by purchase transaction 160. In an implementation, the purchase transaction 160 may include information identifying the merchandise item 104, the customer 106, a customer account, customer payment, etc. Upon receiving the purchase order and/or the payment (e.g., digitally), the management server 140 may transmit the purchase order and/or customer information (e.g., input by the customer 106 during the online purchase) to a computer device (not shown) at the warehouse 112, which may confirm receipt, as represented by order fulfillment transaction 162. The purchase order may include information relating to the merchandise item 104, such as a stock keeping unit identifier, a part identifier, price information, size information, color information, a tag identification for the tag 102 that is or will be attached to the merchandise item 104, etc. The customer information may include a name of the customer 106, delivery information (e.g., address of the customer 106, type of delivery, etc.), gift information, and/or other information.

In certain implementations, in response to receiving the purchase order and/or the customer information, the one or more staff members or a machine at the warehouse 112 may attach the tag 102 to the merchandise item 104 if it is not already attached.

Once the tag 102 is attached to the merchandise item 104, it may be difficult to remove the tag 102 without, for example, damaging the merchandise item 104. The tag 102 may deter would-be thieves from stealing the merchandise item 104 because the difficulty associated with removing the tag 102 and/or potential damages to the merchandise item 104 when the tag 102 is removed without the removal code or other proper means. For example, the tag 102 may include permanent ink that sprays when the tag 102 is removed without the removal code or other proper means.

In some examples, before or after attaching the tag 102 to the merchandise item 104, the one or more staff members or the machine at the warehouse 112 may program some or all of programmed information 103 in the purchase order and/or the customer information into the tag 102 using a programming device 101. The programming device 101 may be a device capable of RF and/or NFC communication. The programming device 101 may receive the programmed information 103 from the management server 140 and program the tag 102 by inputting some or all of the programmed information 103 into the tag 102. As such, the programmed information 103 associates at least the merchandise item 104, and optionally additional purchase order and/or customer information, with the part identifier and/or the tag identification of the tag 102. The programmed information may then be transmitted back to the management server 140, as represented at registration transaction 164, so that the management server 140 can store the information for use to identify authorized requests to remove the tag 102 from the merchandise item 104.

In some examples, the programmed information 103 may include the removal code for detaching the tag 102 from the merchandise item 104.

In some examples, after the registration transaction 164 and after the merchandise item 104 is packaged and loaded on the vehicle 114, the operator of the vehicle 114 may transport the merchandise item 104 to the residence or destination address of the customer 106, as represented by delivery action 166. In some cases, the operator of the vehicle 114 may scan the tag 102 to obtain the residence/delivery address of the customer 106, while in other cases a vision system or other computer system may automatically read or acquire the address.

Additionally, as part of initiating and/or during the delivery process, the operator of the vehicle 114 and/or a machine involved in the delivery process may operate a tag scanning device 115 to scan the tag 102 to obtain information such as the part identifier and/or the tag identification. For example, in an aspect, the tag scanning device 115 may include, but is not limited to, a computer device such as a RFID scanner, a NFC capable mobile phone, etc. The tag scanning device 115 may transmit delivery update information 168 to the management server 140. For example, the operator of the vehicle 114 may notify the management server 140 when he/she picks up the merchandise item 104 for delivery and/or successfully deliver the merchandise item 104 to the residence of the customer 106. In alternative implementations, the delivery of the merchandise item 104 may involve two or more transportation legs, which may include the same or different delivery means (e.g., freight train, plane, trucks, etc.), and the tag 102 may be scanned by the tag scanning device 115 at each point in the delivery process, and the corresponding delivery update information 168 may be transmitted to the management server 140, which can then track the delivery.

When the customer 106 receives the merchandise item 104 delivered via the vehicle 114, the customer 106 may contact the management server 140 via the communication component 109 of the handheld device 108, and/or an application in the handheld device 108, and/or any other computer device, to obtain the removal code. The handheld device 108 may transmit the removal code request and receive a response including the removal code, as represented by removal transaction 170. The handheld device 108 may transmit the removal code to the tag 102 (described in further detail below) to safely remove the tag 102 from the merchandise item 104.

In an alternative implementation, the tag 102 may be used in an in-store purchase but aspects of the present disclosure may allow the customer 106 to remove the tag 102 from the merchandise 104 in a similar manner. In this case, the one or more staff member at the warehouse 112 may attach the tag 102 to the merchandise item 104 and perform the registration transaction 164. Then, the vehicle 114 may transport the merchandise item 104 to the store 110. One or more tag scanning devices xx may transmit delivery update information 168 to the management server 140 as described above. The customer 106 may visit the store 110 and purchase the merchandise item 104, and then perform the removal transaction 170 as described above, either in the store 110 or at another location, e.g., once the customer 106 arrives at home.

Thus, the present solution provides a security tagging system for both online and traditional brick-and-mortar sales of merchandise, and enables the tag 102 to be removed from the merchandise item 104 by the customer 106 based on supplying a removal request with proper authentication. This solution allows the tag 102 to stay on the merchandise item 104 throughout the distribution and/or delivery process, enables tracking of the tag 102, and may prevent a stolen merchandise item 104 from being used since the tag 102 remains on the merchandise item 104.

Figure 2:
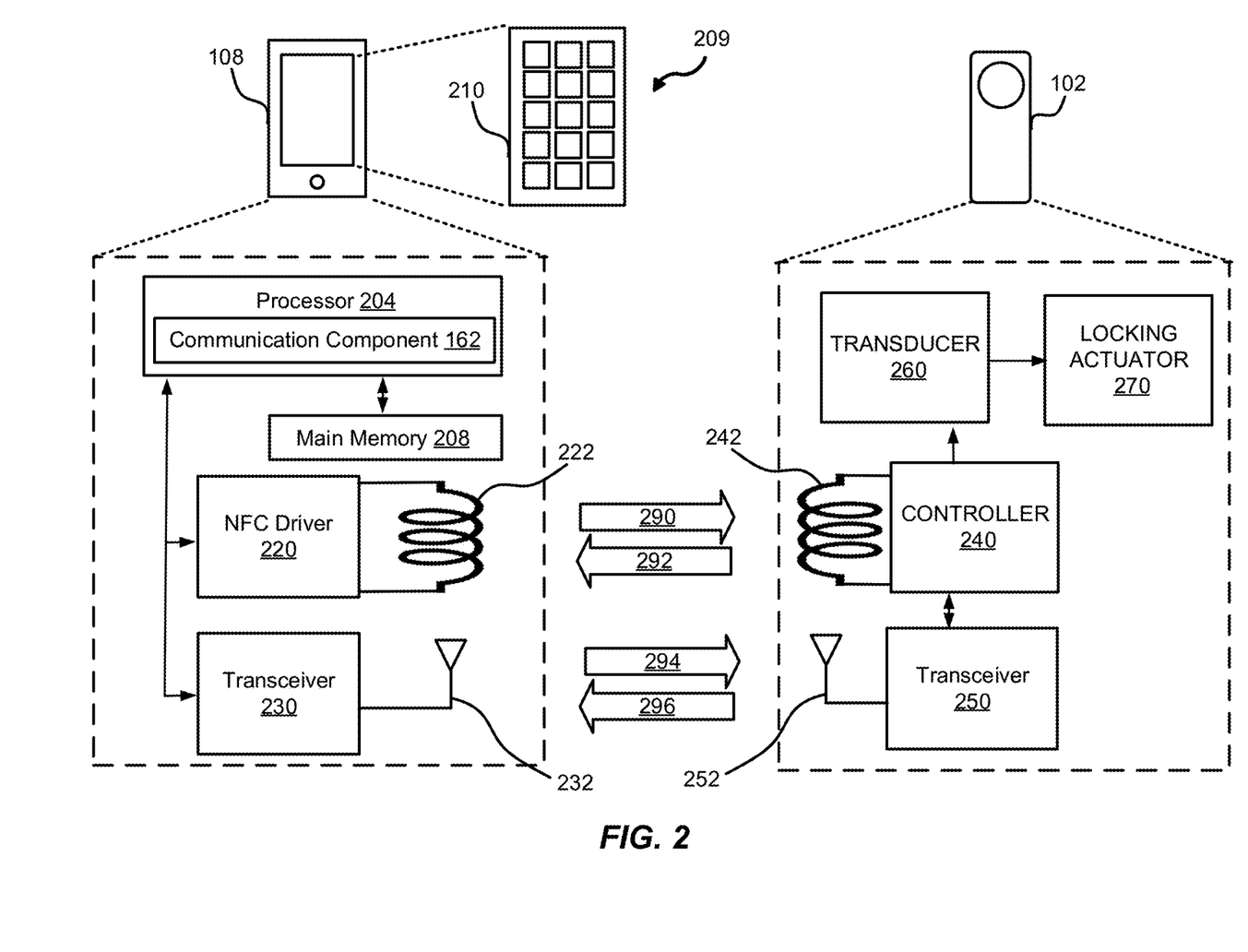
FIG. 2 illustrates an example of communication between a requesting device and the tag in accordance with aspects of the present disclosure.

Referring to FIG. 2, and also referencing FIG. 1, the handheld device 108 may be used to unlock the tag 102. In certain implementations, the handheld device 108 may be configured to unlock the tag 102 for removal from the merchandise item 104 by transmitting, using a NFC driver or a RF transceiver, one or more types of communication signals that may energize the tag 102 ("energy harvesting"). The communication signals may include NFC signals and/or RF signals. In some examples, the NFC signals may be used to power the tag 102 and provide the removal code to the tag 102. In other instances, the RF signals may be used to power the tag 102 and provide the removal code to the tag 102. In yet another example, a combination of NFC and RF signals may be used to power the tag 102 and provide the removal code to the tag 102. In this case, the handheld device 108 may include a processor 204 that executes instructions in a memory 208 to operate a near field communications (NFC) driver 220 and/or a transceiver 230 to enable removal of the tag 102 from the merchandise item 104. The NFC driver 220 may be coupled with a NFC coil 222 configured to transmit and/or receive NFC signals. The NFC coil 222 may include one or more inductors that transmit or receive electromagnetic signals. The transceiver 230 may include RF transmitters and/or receivers that transmit or receive RF signals via an antenna 232. The handheld device 108 may include an tag removal application 209, stored in the memory 208 and executable by the processor 204, for providing a graphical user interface 210 and for generating communications for requesting and/or receiving the removal code from the management server 140 and inputting the received removal code for detaching the tag 102 from the merchandise item 104.

In some aspects, the tag 102 may include a controller 240 that receives NFC energy and/or NFC signals from a NFC coil 242. The NFC coil 242 may include one or more inductors that transmit or receive electromagnetic signals. The tag 102 may include a transceiver 250 that includes RF transmitters and/or receivers that transmit or receive RF signals via an antenna 252. The received RF signals may be used for energy harvesting. The tag 102 may include a transducer that converts electrical energy to mechanical energy. The tag 102 may include a locking actuator 270 that locks or unlocks the tag 102.

In some examples, the handheld device 108 may execute the tag removal application 209 to transmit, via the antenna 232, the transceiver 230, the communication component 109, and/or the processor 204, the removal code request to the management server 140. In response to the removal code, the management server 140 may transmit the removal code to the handheld device 108. After receiving the removal code, via the antenna 232, the transceiver 230, the communication component 109, and/or the processor 204, the handheld device 108 may execute the tag removal application 209 to use the removal code to detach the tag 102 from the merchandise item 104.

In a non-limiting example, the handheld device 108 may execute the tag removal application 209 to transmit an incident NFC signal 290 to the tag 102. Specifically, the NFC driver 220 may apply electrical power to the NFC coil 222. As electrical current passes through the NFC coil 222, a magnetic field that is generated by the NFC coil 222 is "coupled" with the NFC coil 242 of the tag 102. By varying, for example the amplitude of the electrical current provided by the NFC driver 220, the handheld device 108 may provide power and data in the incident NFC signal 290 to the tag 102. The incident NFC signal 290 may include the removal code for removing the tag 102 from the merchandise item 104. In response to receiving the incident NFC signal 290 by the NFC coil 242, the electrical energy in the incident NFC signal 290 may provide the necessary energy to operate the controller 240 of the tag 102. The controller 240, powered by the electrical energy of the incident NFC signal 290, may determine if the removal code in the incident NFC signal 290 matches the removal code necessary to detach the tag 102 from the merchandise item 104. If the handheld device 108 provided the correct removal code, the controller 240 of the tag 102 may transmit an unlocking signal to the transducer 260. The transducer 260 may convert the electrical energy in the unlocking signal to mechanical energy, and utilize the mechanical energy to unlock the locking actuator 270.

In another non-limiting example, the handheld device 108 may execute the tag removal application 209 to transmit an incident RF signal 294 to the tag 102. Specifically, the transceiver 230 may transmit the incident RF signal 294 using the antenna 232. The incident RF signal 294 may include the removal code for removing the tag 102 from the merchandise item 104. In response to the tag 102 receiving the incident RF signal 294 by the antenna 252 and/or the transceiver 250, the electrical energy in the incident RF signal 294 may provide the necessary energy to operate the controller 240. The controller 240, powered by the electrical energy of the incident RF signal 294, may determine if the removal code in the incident RF signal 294 matches the removal code necessary to detach the tag 102 from the merchandise item 104. If the handheld device 108 provided the correct removal code, the controller 240 of the tag 102 may transmit an unlocking signal to the transducer 260. The transducer 260 may convert the electrical energy in the unlocking signal to mechanical energy, and utilize the mechanical energy to unlock the locking actuator 270.

In an aspect of the present disclosure, the handheld device 108 may transmit both the incident NFC signal 290 and the incident RF signal 294 to the tag 102. The incident NFC signal 290 may provide the energy to power the tag 102 and the incident RF signal 294 may include the removal code for removing the tag 102 from the merchandise item 104. In response to receiving the incident NFC signal 290 by the NFC coil 242, the electrical energy in the incident NFC signal 290 may provide the necessary energy to operate the controller 240. The controller 240, powered by the electrical energy of the incident NFC signal 290, may determine if the removal code in the incident RF signal 294 matches the removal code necessary to detach the tag 102 from the merchandise item 104. If the handheld device 108 provided the correct removal code, the controller 240 may transmit an unlocking signal to the transducer 260. The transducer 260 may convert the electrical energy in the unlocking signal to mechanical energy, and utilize the mechanical energy to unlock the locking actuator 270. Other ways of providing electrical energy and/or the removal code to the tag 102 may be utilized according to aspects of the present disclosure.

Still referring to FIG. 2 and referencing FIG. 1, the tag 102 may provide a response NFC signal 292 and/or a response RF signal 296 to the handheld device 108. The response NFC signal 292 and/or the response RF signal 296 may be generated by the controller 240 and/or the transceiver 250 using the energy of the incident NFC signal 290 and/or the incident RF signal 294. For example, if the handheld device 108 provided an incorrect removal code in the incident NFC signal 290, the tag 102 may notify the handheld device 108, via the response NFC signal 292 that the removal code provided is incorrect and the tag 102 will remain attached to the merchandise item 104. In other examples, if the handheld device 108 provided an incorrect removal code in the incident RF signal 294, the tag 102 may notify the handheld device 108, via the response RF signal 296 that the removal code provided is incorrect and the tag 102 will remain attached to the merchandise item 104.

In other aspects, the tag 102 may provide other information, such as information in the programmed information 103, by transmitting the response NFC signal 292 or the response RF signal 296 to, for example, the tag scanning device 115.

Figure 3A:
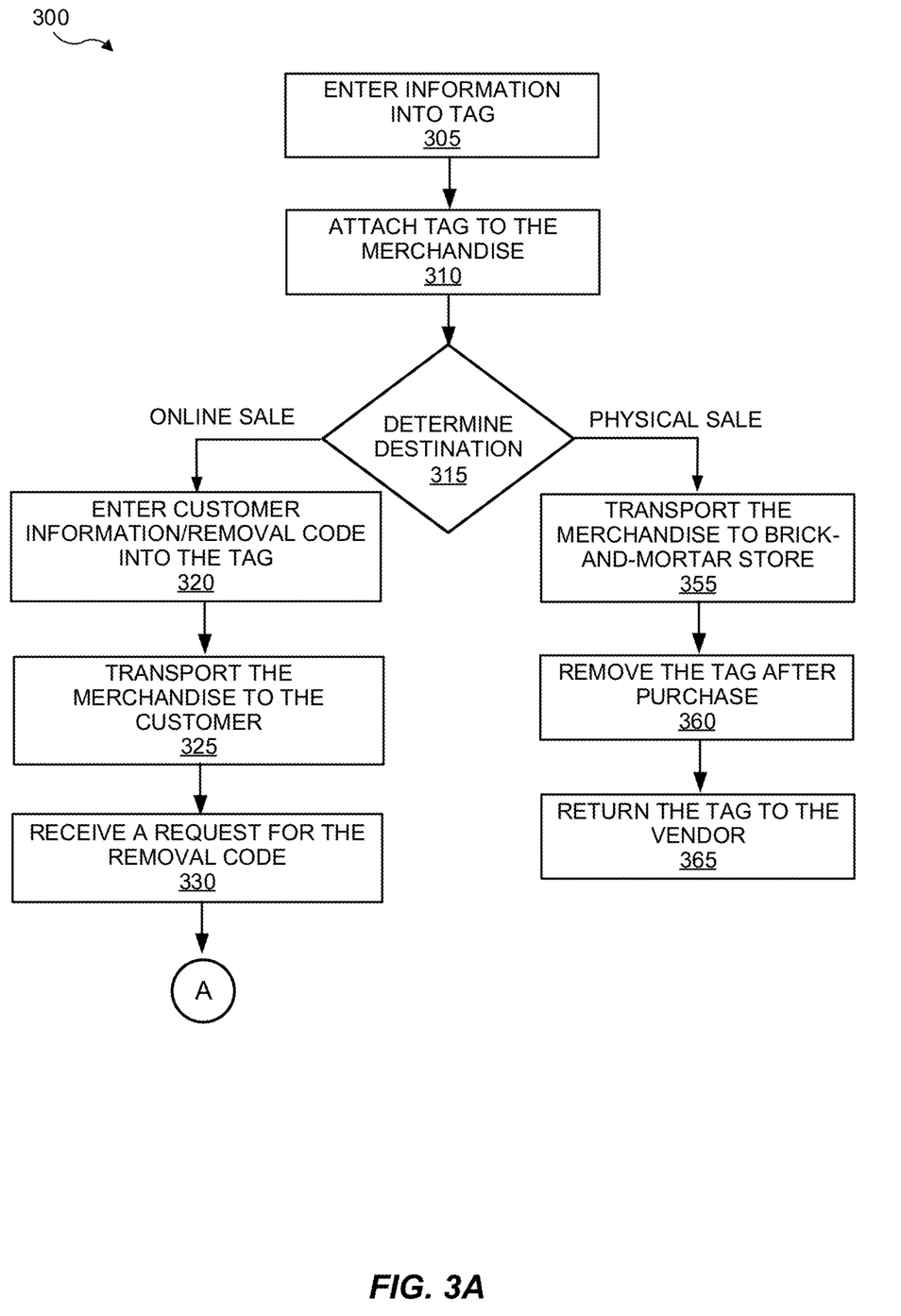
FIGS. 3A-B illustrate an example of a method for the attachment and removal of the tag in accordance with aspects of the present disclosure.
Figure 3B:
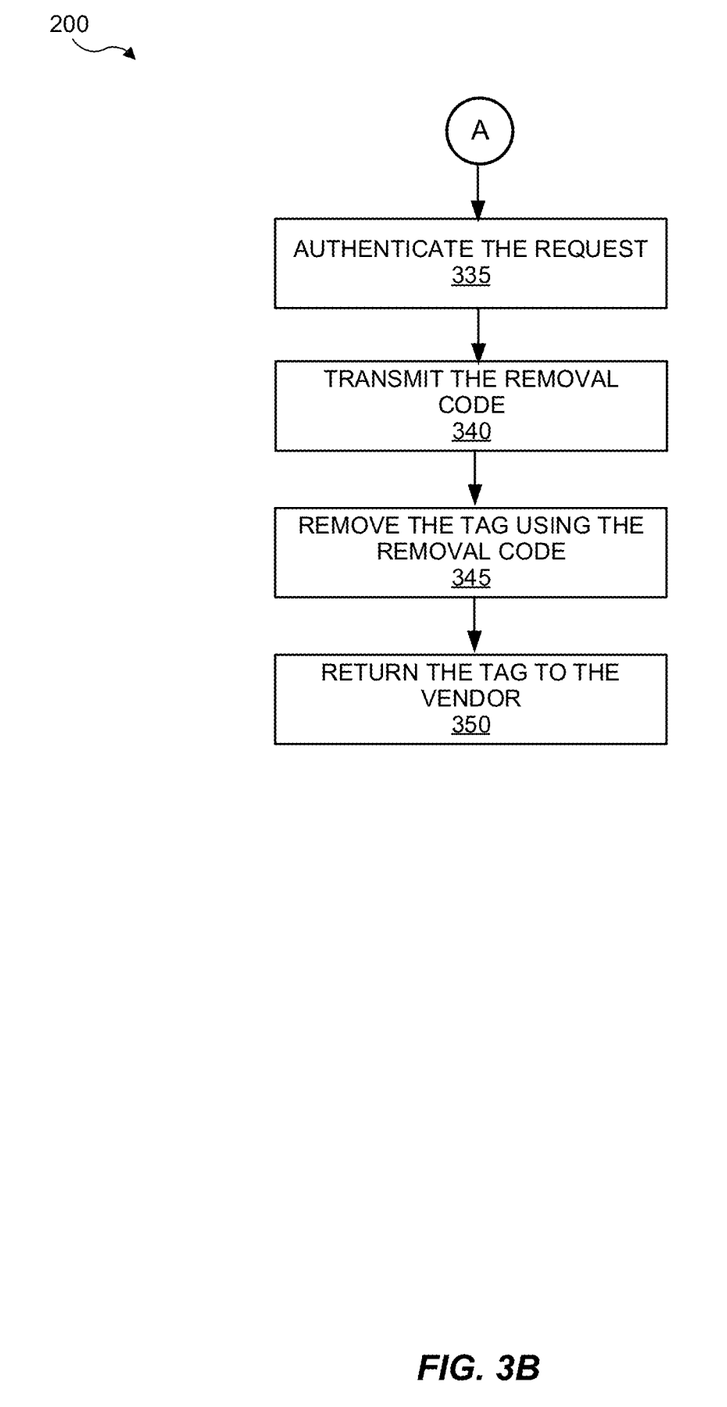

Turning now to FIGS. 3A and 3B, referencing FIGS. 1-2, an example of a method 300 for the attachment and removal of the tag 102 may be implemented for the online sale or the physical sale of the merchandise item 104. The method 300 may be performed by one or more of the programming device 101, the scanning device 115, the handheld device 108, and/or the management server 140.

At block 305, the method 300 may include the one or more staff member or machine of the warehouse 112 entering information into the tag 102 via the programming device 101. For example, the programming device 101 may transmit the merchandise item information associated with the merchandise item 104 to the tag 102. The merchandise item information may include information associated with the purchase transaction 160, the order fulfillment transaction 162, and/or the registration transaction 164. The merchandise item information may include information such as a stock keeping unit identifier, a part identifier, price information, size information, color information, and/or other information relating to the merchandise item 104. In other examples, the one or more staff member of the warehouse 112 may program the removal code (that unlocks the tag 102) into the tag 102. In one example, the one or more staff member of the warehouse 112 may program the removal code for an online sale of the merchandise item 104.

At block 310, in some aspects, the method 300 may include the one or more staff member or machine of the warehouse 112 attaching the tag 102 to the merchandise item 104.

At block 315, in certain implementations, the programming device 101 may determine the destination (e.g., residence of the customer 106 or the store 110) and/or sales type of the merchandise item 104.

At block 320, in response to determining that the merchandise item 104 is to be delivered to the residence of the customer 106 after the online sale, the programming device 101 may transmit the customer information and/or the removal code to the tag 102. The customer information may include a name of the customer 106, delivery information (e.g., address of the customer 106, type of delivery, etc.), gift information, and/or other information. The removal code may include any text string, alpha-numeric string, number string, symbol string, or any combination thereof. In some examples, each tag 102 may be configured to accept and/or unlock using a number of removal codes (e.g., 2, 3, 4, 5, 10, 50 etc.) for additional security (e.g., if a removal code is "leaked," other removal codes may be used). For example, the tag 102 may be programmed to accept the removal codes 12345, abcdefgh, UKLM, !@#$, and 1a!2B@. The removal codes may be hardwired into the tag 102 or programmable by software. When the programming device 101 inputs the removal code 1a!2B@ into the tag 102, the handheld device 108 must input the same removal code, namely 1a!2B@ to detach the tag 102 from the merchandise item 104. The customer 106 or an unauthorized person will be unable to use other removal codes (e.g., 12345, abcdefgh, IJKLM, or !@#$,) to detach the tag 102 from the merchandise item 104. In another implementation, the tag 102 may be programmed so any of the removal codes (e.g., 12345, abcdefgh, IJKLM !@#$, and 1a!2B@) may be used by the handheld device 108 to detach the tag 102 from the merchandise item 104.

At block 325, the operator of the vehicle 114 may transport the merchandise item 104 (possibly with other products) to the customer 106. The operator of the vehicle 114 may scan the tag 102 to obtain the address of the residence of the customer 106 using the scanning device 115. The scanning device 115 may scan the tag 102 to obtain information such as the part identifier and/or the tag identification. The scanning device 115 may transmit update information to the management server 140. For example, the scanning device 115 may notify the management server 140 when he/she picks up the merchandise item 104 for delivery and/or successfully deliver the merchandise item 104 to the residence of the customer 106. In alternative implementations, one or more transportation means may be utilized for delivery (e.g., freight train, plane, trucks, etc.).

At block 330, the management server 140 and/or the communication component 142 may receive a request for the removal code from the handheld device 108 of the customer 106. The request may include the customer information, the purchase order information, and/or the merchandise item information. The management server 140 may rely on the information embedded in the request to identify the appropriate removal code.

At block 335, the management server 140 may authenticate the request for the removal code. The management server 140 and/or the authentication component 144 may authenticate based on the information (e.g., the customer information, the purchase order information, and/or the merchandise item information) in the request. For example, the management 140 server may use the purchase order information to confirm that the customer 106 purchased the merchandise item 104. The management 140 server may use the purchase order information to confirm that the handheld device 108 that sent the request is registered to the customer 106 that purchased the merchandise item 104.

At block 340, in response to the authenticating the request, the management server 140 may transmit the removal code to the handheld device 108 of the customer 106.

At block 345, after receiving the removal code, the handheld device 108 may send the removal code to the tag 102 to remove the tag. In one implementation, the handheld device 108 may transmit the incident NFC signal 290 and/or the incident RF signal 294 to the tag 102 as described above. The incident NFC signal 290 and/or the incident RF signal 294 may include the removal code. After receiving the removal code (assumed to be correct), the tag 102 may unlock the locking actuator 270.

At block 350, the customer 106 may return the tag 102 to the vendor. The vendor may provide an incentive program for the customer 106 to return the tag 102. For example, the vendor may provide a discount (e.g., 5% off next purchase), a free product (e.g., an accessory, part, add-on, up-grade etc.), and/or a free service (e.g., shipping, maintenance, notification, etc.) when the customer 106 returns the tag 102. In another example, the customer 106 may receive the incentive after a number of returned tags, such as 2, 5, 10, or more.

In optional implementations, the management server 140 may transmit the merchandise item information to a smart storage container 190 associated with the customer 106 so that an inventory of the items may be easily stored and accessed. The smart storage container 190 may be a container that stores items owned by the customer 106. The smart storage container 190 may include computer hardware and/or software to inventory items stored therein. Examples of the smart storage container 190 may include a smart dresser, a smart closet, a smart toolbox, a smart refrigerator, or other containers. In one non-limiting example relating to a toolbox, the management server 140 may transmit merchandise item information to a smart toolbox device associated with the customer 106, wherein the merchandise item information specifically identifies (e.g., based on text, SKU or other identifier) what type, brand, or other relevant tool information associated with the merchandise item 104. In another example relating to a closet, the management server 140 may transmit the merchandise item information identifying what type, brand, etc., of clothing is associated with the merchandise item 104 to a smart closet device associated with the customer 106. The present disclosure includes other similar applications for automatically managing an inventory of other types of items.

Returning to block 315, in certain implementations, the one or more staff member of the warehouse 112 may determine the destination (e.g., residence of the customer 106 or the store 110) or sale type of the merchandise item 104 is associated with the store 110.

At block 355, in response to determining that the merchandise item 104 is to be delivered to the store 110, the operator of the vehicle 114 may transport the merchandise item 104 (possibly with other products) to the store 110. The operator of the vehicle 114 may scan the tag 102 to obtain information such as the part identifier and/or the tag identification. The operator of the vehicle 114 may transmit update information to the management server 140. For example, the operator of the vehicle 114 may notify the management server 140 when he/she picks up the merchandise item 104 for delivery and/or successfully deliver the merchandise item 104 to the residence of the customer 106. In alternative implementations, one or more transportation means may be utilized for delivery (e.g., freight train, plane, trucks, etc.).

At block 360, the clerk in the store 110 and/or the customer 106 may remove the tag 102 after a purchase in the store 110 using aspects of the present disclosures. The customer 106 may remove the tag 102 in a self-checkout process.

At block 365, the clerk in the store 110 and/or the customer 106 may return the tag 102 to the vendor.

Figure 4:
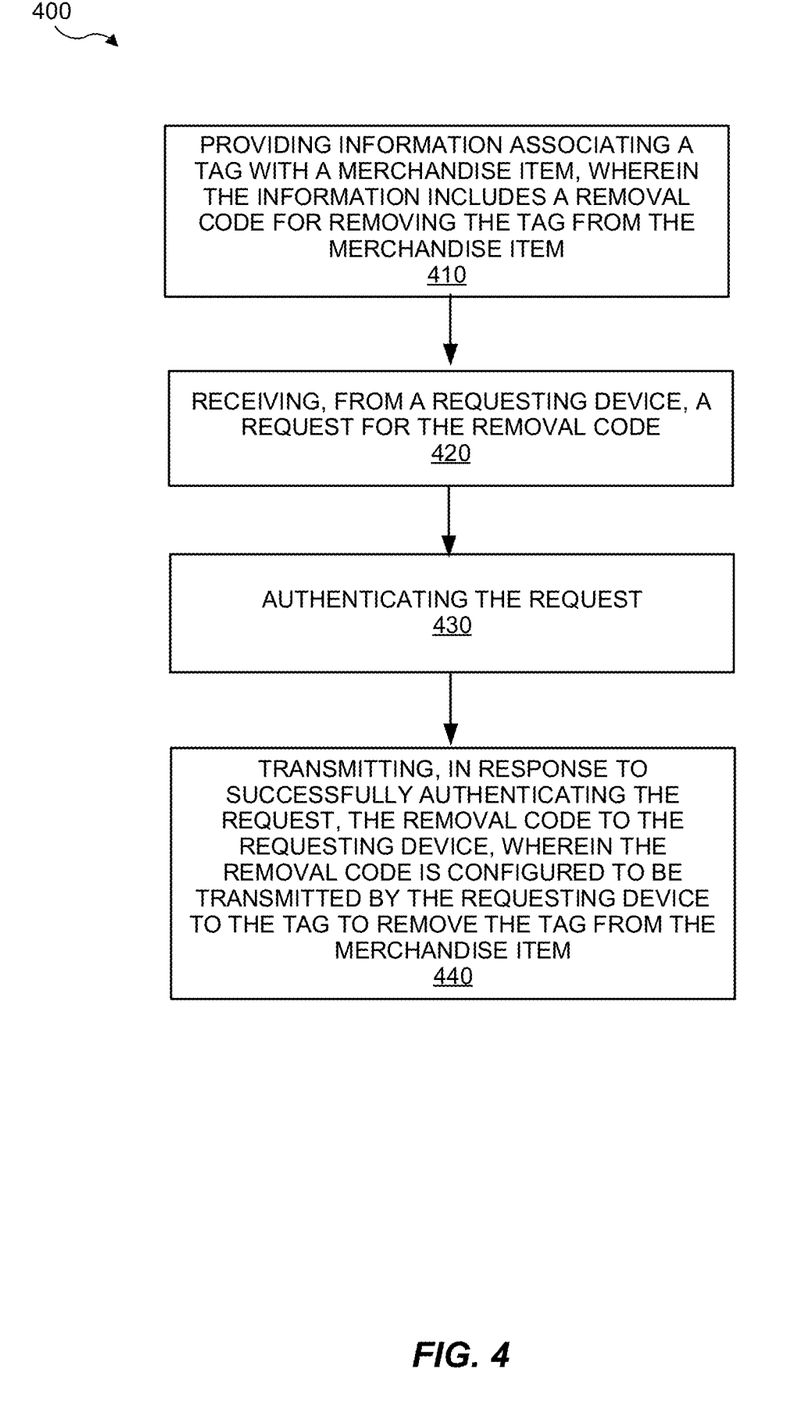
FIG. 4 illustrates an example of a method for utilizing the tag in accordance with aspects of the present disclosure.

Referring to FIG. 4, a method 400 for managing the removal code for the tag 102 may be performed by the management server 140, the communication component 142, and/or the authentication component 144.

At block 410, the method 400 may provide information associating the tag with a merchandise item, wherein the information includes a removal code for removing the tag from the merchandise item. For example, the communication component 142 and/or the management server 140 may transmit at least one of the removal code, the customer information, the purchase order information, and/or the merchandise item information to the programing device 101. The customer information may include the email, address, phone number, shopping preferences, purchase history, and/or other information relating to the customer 106. The purchase order information may include the price of the merchandise item 104, delivery method, payment confirmation, gift instructions or other information relating to the purchase of the merchandise item 104. The merchandise item information may include information such as a stock keeping unit identifier, a part identifier, price information, size information, color information, and/or other information relating to the merchandise item 104.

At block 420, the method 400 may receive, from a requesting device, a request for the removal code. For example, the communication component 142 and/or the management server 140 may receive a request for the removal code from the handheld device 108. The customer 106 may request the removal code after completing the purchase of the merchandise item 104 via the handheld device 108. In one non-limiting example, the customer 106 may request the removal code via the interface 210 of the application in the handheld device 108 after receiving the merchandise item 104 delivered by the operator of the vehicle 114. The request for the removal code may include authentication information such as the customer information, the purchase order information, or other information used to confirm that the customer 106 has lawfully purchased the merchandise item 104. In one example, the request may include purchase order number for buying the merchandise item 104.

At block 430, the method 400 may authenticate the request. For example, the authentication component 144 of the management server 140 may compare the purchase order number in the request with the purchase order number associated with the purchase of the merchandise item 104. If the two numbers match, the authentication component 144 may determine that the request is valid.

At block 440, the method 400 may transmit, in response to successfully authenticating the request, the removal code to the requesting device, wherein the removal code is configured to be transmitted by the requesting device to the tag to remove the tag from the merchandise item. For example, the communication component 142 and/or the management server 140 may transmit the removal code (after successfully authenticating the request) to the handheld device 108. Upon receiving the removal code, the handheld device 108 may transmit the removal code via the incident NFC signal 290 and/or the incident RF signal 294 to the tag 102 to detach the tag 102 from the merchandise item 104.

In optional implementations, prior to transmitting the removal code, the management server 140 may receive one or more updates associated with the merchandise item 104.

In some examples, the one or more updates may include at least one of a pickup information, transit information, or delivery information.

In some aspects, prior to providing the information, the management server 140 may select the removal code from a plurality of removal codes associated with the tag 102.

In certain examples, after transmitting the removal code, the management server 140 may receive an indication that the tag 102 has been returned.

In some implementations, the management server 140 may select a different removal code from the plurality of removal codes for a next purchase.

In an aspect, the management server 140 may transmit at least a portion of merchandise item information associated with the merchandise item 104 to a smart storage container associated with the customer 106.

Aspects of the present disclosures, such as the handheld device 108, the management server 140, the scanning device 115, and/or the programming device 101, may be implemented using hardware, software, or a combination thereof and may be implemented in one or more computer systems or other processing systems. In an aspect of the present disclosures, features are directed toward one or more computer systems capable of carrying out the functionality described herein., such as the example computer system 500 shown in FIG. 5.

Figure 5:
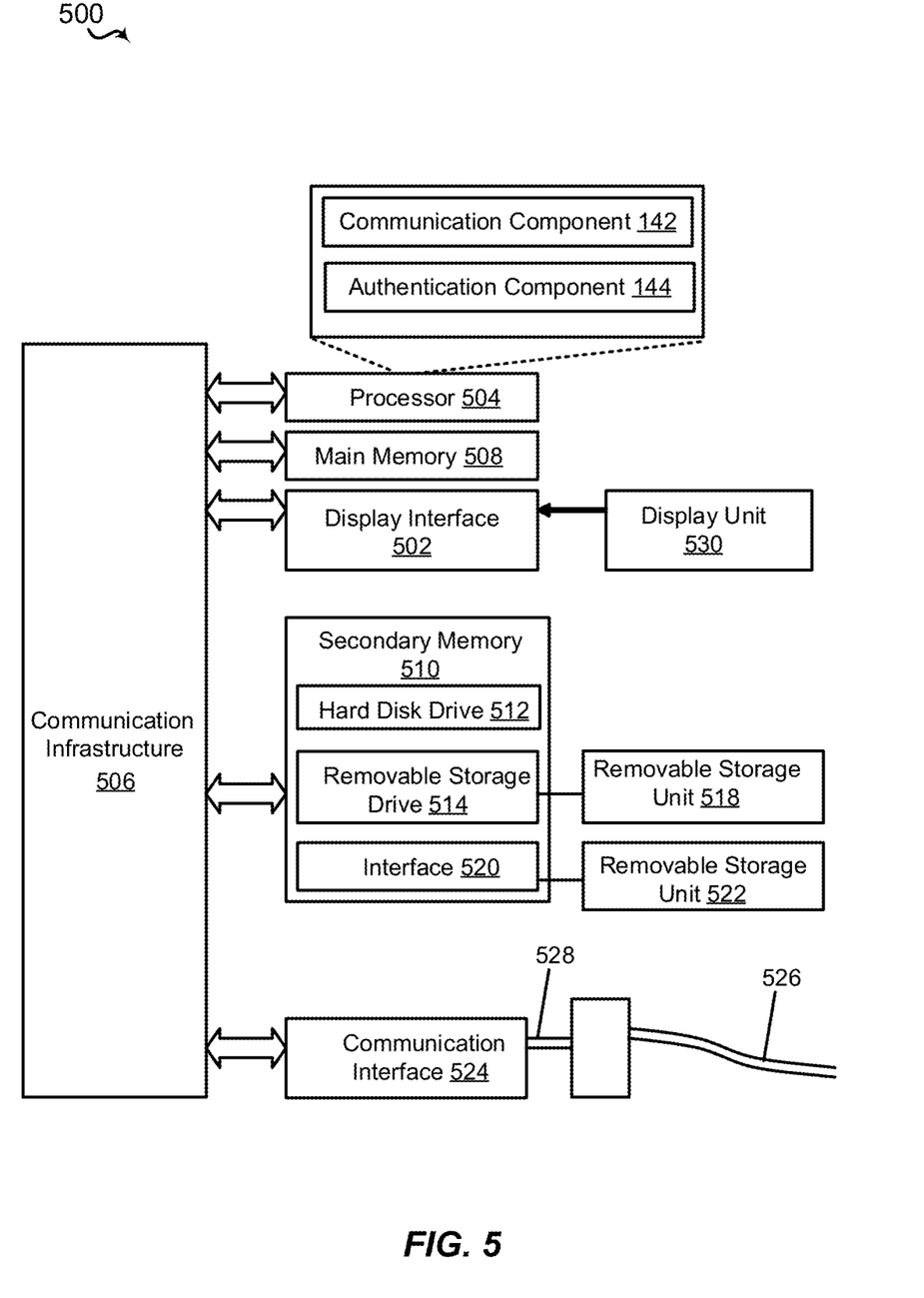
FIG. 5 illustrates an example of a computer system in accordance with aspects of the present disclosure.

The computer system 500 includes one or more processors, such as processor 504. The processor 504 is connected with a communication infrastructure 506 (e.g., a communications bus, cross-over bar, or network). Various software aspects are described in terms of this example computer system. After reading this description, it will become apparent to a person skilled in the relevant art(s) how to implement aspects of the disclosures using other computer systems and/or architectures.

The computer system 500 may include a display interface 502 that forwards graphics, text, and other data from the communication infrastructure 506 (or from a frame buffer not shown) for display on a display unit 530. Computer system 500 also includes a main memory 508, preferably random access memory (RAM), and may also include a secondary memory 510. The secondary memory 510 may include, for example, a hard disk drive 512, and/or a removable storage drive 514, representing a floppy disk drive, a magnetic tape drive, an optical disk drive, a universal serial bus (USB) flash drive, etc. The removable storage drive 514 reads from and/or writes to a removable storage unit 518 in a well-known manner. Removable storage unit 518 represents a floppy disk, magnetic tape, optical disk, USB flash drive etc., which is read by and written to removable storage drive 514. As will be appreciated, the removable storage unit 518 includes a computer usable storage medium having stored therein computer software and/or data. In some examples, one or more of the main memory 508, the secondary memory 510, the removable storage unit 518, and/or the removable storage unit 522 may be a non-transitory memory.

Alternative aspects of the present disclosures may include secondary memory 510 and may include other similar devices for allowing computer programs or other instructions to be loaded into computer system 500. Such devices may include, for example, a removable storage unit 522 and an interface 520. Examples of such may include a program cartridge and cartridge interface (such as that found in video game devices), a removable memory chip (such as an erasable programmable read only memory (EPROM), or programmable read only memory (PROM)) and associated socket, and other removable storage units 522 and interfaces 520, which allow software and data to be transferred from the removable storage unit 522 to computer system 500.

Computer system 500 may also include a communications interface 524. Communications interface 524 allows software and data to be transferred between computer system 500 and external devices. Examples of communications interface 524 may include a modem, a network interface (such as an Ethernet card), a communications port, a Personal Computer Memory Card International Association (PCMCIA) slot and card, etc. Software and data transferred via communications interface 524 are in the form of signals 528, which may be electronic, electromagnetic, optical or other signals capable of being received by communications interface 524. These signals 528 are provided to communications interface 524 via a communications path (e.g., channel) 526. This path 526 carries signals 528 and may be implemented using wire or cable, fiber optics, a telephone line, a cellular link, an RF link and/or other communications channels. In this document, the terms "computer program medium" and "computer usable medium" are used to refer generally to media such as a removable storage drive 518, a hard disk installed in hard disk drive 512, and signals 528. These computer program products provide software to the computer system 500. Aspects of the present disclosures are directed to such computer program products.

Computer programs (also referred to as computer control logic) are stored in main memory 508 and/or secondary memory 510. Computer programs may also be received via communications interface 524. Such computer programs, when executed, enable the computer system 500 to perform the features in accordance with aspects of the present disclosures, as discussed herein. In particular, the computer programs, when executed, enable the processor 504 to perform the features in accordance with aspects of the present disclosures. Accordingly, such computer programs represent controllers of the computer system 500.

In an aspect of the present disclosures where the method is implemented using software, the software may be stored in a computer program product and loaded into computer system 500 using removable storage drive 514, hard drive 512, or communications interface 520. The control logic (software), when executed by the processor 504, causes the processor 504 to perform the functions described herein. In another aspect of the present disclosures, the system is implemented primarily in hardware using, for example, hardware components, such as application specific integrated circuits (ASICs). Implementation of the hardware state machine so as to perform the functions described herein will be apparent to persons skilled in the relevant art(s).

The term "processor," as used herein, can refer to a device that processes signals and performs general computing and arithmetic functions. Signals processed by the processor can include digital signals, data signals, computer instructions, processor instructions, messages, a bit, a bit stream, or other computing that can be received, transmitted and/or detected. A processor, for example, can include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described herein.

The term "bus," as used herein, can refer to an interconnected architecture that is operably connected to transfer data between computer components within a singular or multiple systems. The bus can be a memory bus, a memory controller, a peripheral bus, an external bus, a crossbar switch, and/or a local bus, among others.

The term "memory," as used herein, can include volatile memory and/or nonvolatile memory. Non-volatile memory can include, for example, ROM (read only memory), PROM (programmable read only memory), EPROM (erasable PROM) and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DR-RAM).

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A method of managing a tag, comprising:
    selecting a removal code from a plurality of removal codes associated with the tag being locked to a merchandise item purchased by a customer;
    providing information associating the tag with the merchandise item, wherein the information includes the removal code for removing the tag from the merchandise item;
    receiving, from a requesting device associated with a recipient of the merchandise item shipped by a vendor of the merchandise item, a request for the removal code;
    authenticating the request; and
    transmitting, in response to successfully authenticating the request, the removal code to the requesting device, wherein the removal code is configured to be transmitted by the requesting device to the tag to remove the tag from the merchandise item.

2. The method of claim 1, further comprising receiving, prior to transmitting the removal code, one or more updates associated with the merchandise item.

3. The method of claim 2, wherein the one or more updates include at least one of a pickup information, transit information, or delivery information.

4. The method of claim 1, further comprising receiving, after transmitting the removal code, an indication that the tag has been returned.

5. The method of claim 4, further comprising selecting a different removal code from the plurality of removal codes for a next purchase.

6. The method of claim 1, further comprising transmitting at least a portion of merchandise item information associated with the merchandise item to a smart storage container associated with a customer that purchased the merchandise item.

7. The method of claim 1, wherein:
the request includes at least one of customer information, purchase order information, or merchandise item information; and
authenticating the request comprises authenticating the request based on the at least one of the customer information, the purchase order information, or the merchandise item information.

8. A server, comprising:
a memory, and
one or more processors operatively connected to the memory, the one or more processors being configured to:
select a removal code from a plurality of removal codes associated with a tag being locked to a merchandise item purchased by a customer;
provide information associating the tag with the merchandise item, wherein the information includes the removal code for removing the tag from the merchandise item;
receive, from a requesting device associated with a recipient of the merchandise item shipped by a vendor of the merchandise item, a request for the removal code;
authenticate the request; and
transmit, in response to successfully authenticating the request, the removal code to the requesting device, wherein the removal code is configured to be transmitted by the requesting device to the tag to remove the tag from the merchandise item.

9. The server of claim 8, wherein the one or more processors is further configured to receive, prior to transmitting the removal code, one or more updates associated with the merchandise item.

10. The server of claim 9, wherein the one or more updates includes at least one of a pickup information, transit information, or delivery information.

11. The server of claim 8, wherein the one or more processors is further configured to receive, after transmitting the removal code, an indication that the tag has been returned.

12. The server of claim 11, wherein the one or more processors is further configured to select a different removal code from the plurality of removal codes for a next purchase.

13. The server of claim 8, wherein the one or more processors is further configured to transmit at least a portion of merchandise item information associated with the merchandise item to a smart storage container associated with a customer that purchased the merchandise item.

14. A method for removing a tag, comprising:
transmitting, from a handheld device to a server, a request for a removal code for removing a tag from a merchandise item purchased by a customer, wherein the request includes authentication information and the removal code is one of a plurality of removal codes associated with the tag, wherein the handheld device is associated with a recipient of the merchandise item shipped by a vendor of the merchandise item;
receiving, in response to transmitting the request, the removal code from the server; and
transmitting the removal code to the tag to remove the tag from the merchandise item.

15. The method of claim 14, wherein a signal containing the removal code provides energy to the tag.

16. The method of claim 14, further comprising transmitting an energy signal different from a code signal containing the removal code, wherein the energy signal provides energy to the tag.

17. A device, comprising:
a memory;
at least one of a NFC driver or a RF transceiver; and
one or more processors configured to:
transmit, via the RF transceiver, a request for a removal code for removing a tag from a merchandise item purchased by a customer, wherein the request includes authentication information and the removal code is one of a plurality of removal codes associated with the tag, wherein the device is associated with a recipient of the merchandise item shipped by a vendor of the merchandise item,
receive, via the RF transceiver, in response to transmitting the request, the removal code from a server, and
transmit, via the at least one of the NFC driver or the RF transceiver, the removal code to the tag to remove the tag from the merchandise item.

18. The device of claim 17, wherein a signal containing the removal code provides energy to the tag.

19. The device of claim 17, wherein the one or more processors are further configured to transmit an energy signal different from a code signal containing the removal code, wherein the energy signal provides energy to the tag.

* * * * *